No. 12,518. REISSUED JULY 31, 1906.

F. E. ABBOTT.

BRIDGE PLATE FOR RAIL JOINTS.

APPLICATION FILED JUNE 23, 1906.

2 SHEETS—SHEET 1.

WITNESSES.

J. R. Keller

Robert C. Potter

INVENTOR.

Franklin E. Abbott

By Kay Potter & Winter attorneys

No. 12,518. REISSUED JULY 31, 1906.

F. E. ABBOTT.

BRIDGE PLATE FOR RAIL JOINTS.

APPLICATION FILED JUNE 23, 1906.

2 SHEETS—SHEET 2.

WITNESSES.

J. R. Keller

Robert C. Totten

INVENTOR.

Franklin E. Abbott

By Kay Totten & Sinton attorneys

UNITED STATES PATENT OFFICE.

FRANKLIN E. ABBOTT, OF BUFFALO, NEW YORK.

BRIDGE-PLATE FOR RAIL-JOINTS.

No. 12,518. Specification of Reissued Letters Patent. Reissued July 31, 1906.

Original No. 689,151, dated December 17, 1901. Application for reissue filed June 23, 1906. Serial No. 323,122.

*To all whom it may concern:*

Be it known that I, FRANKLIN E. ABBOTT, a citizen of the United States, residing in Buffalo, county of Erie, and State of New York, formerly residing in Chicago, in the county of Cook, State of Illinois, have invented certain new and useful Improvements in Bridge-Plates for Rail-Joints, of which the following is a specification, reference being had to the accompanying drawings.

My invention relates to bridge-plates for rail-joints, and particularly to that class of bridge-plates where the joint between the rails comes between the ties; and its object is to provide a bridge-plate which shall afford a firm truss-like support for the joint and shall prevent the rail from creeping.

To that end my invention in its essence consists of a bridge-plate having a continuous reverse flange upon each side thereof formed of a central downward-projecting portion and two upward-projecting portions at the ends of the downward-projecting portion and extending above the surface of the plate. The downward-projecting portion of the flange comes between the ties when the joint and bridge-plate are in position, and the upward-projecting portions lie with their deepest portions over the inner edges of the ties—that is, over the edges of the two ties upon which the joint is supported—and so afford a truss-like resistance against any downward pressure which would tend to bend the bridge-plate over the edges of the ties. The plate is also provided at each end with upward-projecting lugs, between which the rail rests and which are adapted to abut upon each end of the angle-irons which secure the rails together at the joint, so as to prevent longitudinal creeping of the rails.

Figure 1:
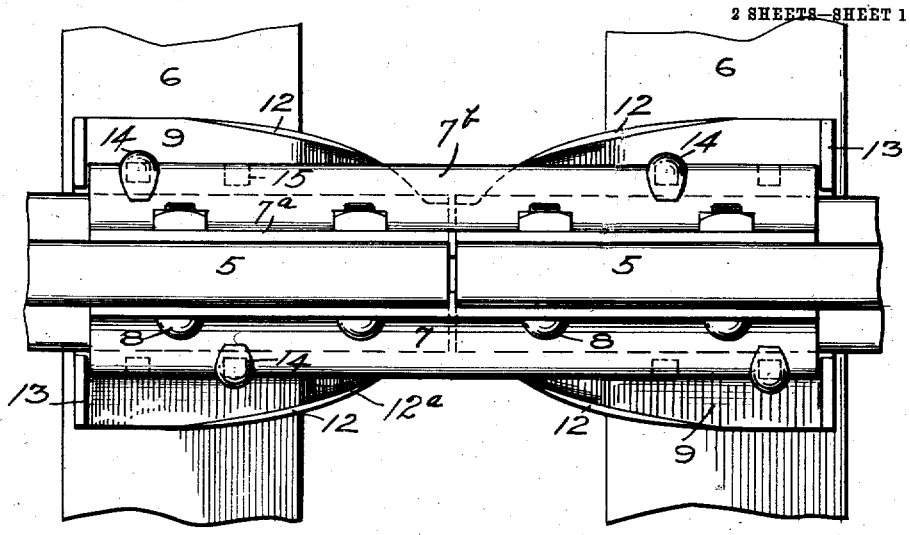
Figure 2:
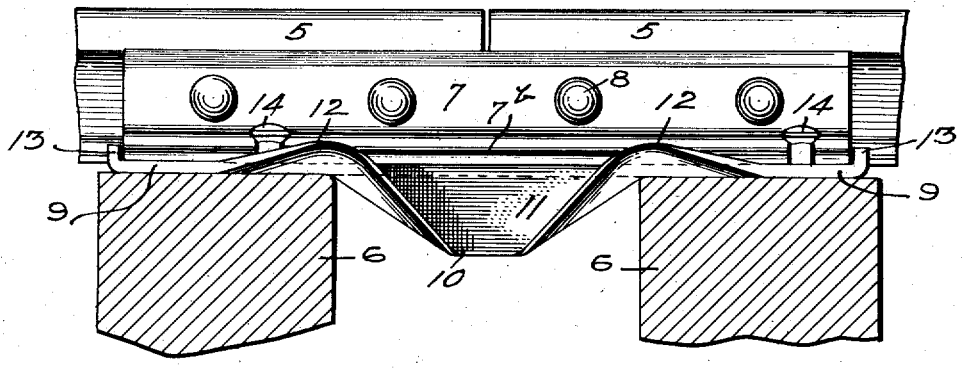
Figure 3:
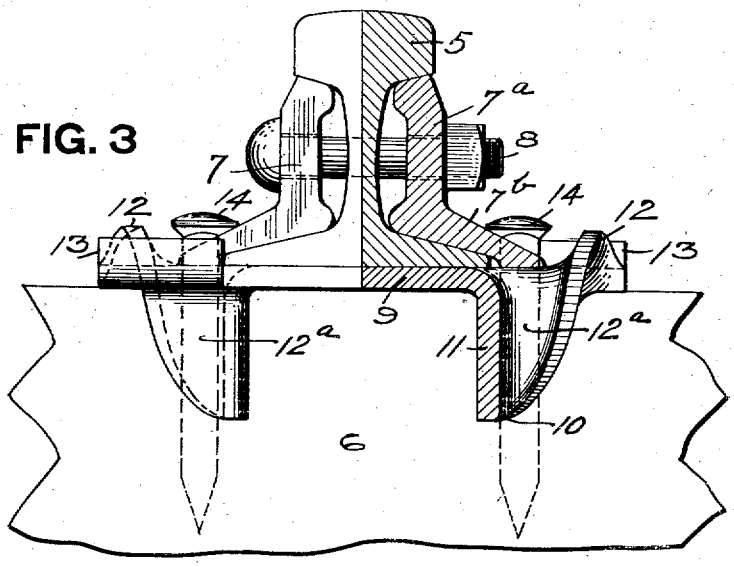
Figure 4:
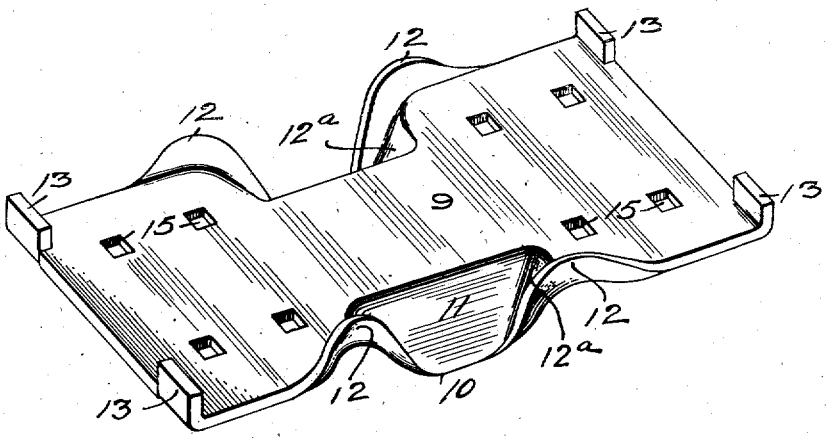

Referring to the drawings, Figure 1 is a top or plan view. Fig. 2 is a side elevation. Fig. 3 is an end elevation, partly in section; and Fig. 4 is an isometric view of the bridge-plate.

In the accompanying drawings, 5 indicates the rails, coming together at a point between the ties 6 6.

7 indicates angle-bars of the usual well-known description, which form a fish-plate at the joint of the rails and consist of a web $7^a$ and base $7^b$. The angle-bars 7 are secured to the rail by the bolts 8 in the usual well-known manner.

9 indicates the bridge-plate, which rests at each end upon and is supported by the ties 6 6 below the rail.

The bridge-plate 9 is preferably constructed of steel plate and is molded upon or rolled or otherwise formed with a continuous reverse flange 10 upon each side thereof midway between the ends of the plate. The flange 10 consists of a central downward-projecting portion 11 and two upward-projecting portions 12 at the ends thereof. The upward-projecting portions 12, as is best shown in Figs. 2 and 4, begin to curve upward at points near the ends of the bridge-plate and then curve downward, meeting the downwardly-bent portion 11, being connected thereto by the laterally-extending portions $12^a$. When the bridge-plate is in position, the downward-projecting portion 11 of the flange 10 rests midway between the ties and affords a truss-like support to the rail-joint against downward pressure between the ties, the upward-projecting portions 12 resting with their deepest portions over or close to the inner faces of the ties 6, thus affording a truss-like resistance against any downward pressure, which would tend to bend the bridge-plate over the edges of the ties. The upward-projecting portions 12 of the continuous flanges 10 extend diagonally inward, as well as upward, and act with the laterally-extending portions $12^a$ to stiffen the bridge-plate laterally, so that the continuous flanges at the sides of the plate sustain both lateral and longitudinal strains.

The bridge-plate 9 is also provided at each end with upward-projecting lugs 13, which are spaced a distance apart about equal to the foot of the rail 5, so that the rails may rest between them, and the bridge-plate 9 is of such length that the lugs 13 will abut upon the ends of the base $7^b$ of the angle-bars 7. As the angle-bars 7 are in the usual manner secured to the rails by the bolts 8, it is obvious that the abutting of the angle-bars 7 against the lugs 13 will prevent longitudinal creeping of the rails.

The joint and the bridge-plate are fastened to the ties by spikes 14 in the usual manner, which pass through suitable notches in the edge of the base $7^b$ of the angle-bars 7 and through suitable openings 15 in the bridge-plate 9.

That which I claim as my invention, and desire to secure by Letters Patent, is—

1. A bridge-plate, provided with a continuous flange at the side thereof consisting of a downward-projecting portion, and a reverse upward-projecting portion at each end of said downward-projecting portion, substantially as described.

2. A bridge-plate, provided with continuous reverse flanges each consisting of a downward-projecting portion and an upward-projecting portion at each end thereof, substantially as described.

3. A wrought-metal bridge-plate having formed from the body and upon each side thereof a continuous reverse flange, each such flange consisting of a central downward-projecting portion and a reverse upward-projecting portion at each end thereof, substantially as described.

4. A wrought-metal bridge-plate having formed from the body and on each side thereof a continuous reverse flange, each consisting of a central downward-projecting portion, a reverse upward-projecting portion at each end thereof, and laterally-extending portions connecting the downward and upward projecting portions, substantially as described.

5. A bridge-plate provided with continuous reverse flanges each consisting of a downward-projecting portion and an upward-projecting portion at each end thereof, and upward-projecting lugs adapted to abut upon each end of the angle-bars of a rail-joint, substantially as described.

6. A rail-joint, consisting of the combination of angle-bars having a web and base, and a bridge-plate adapted to be placed below and support the rails, having upon each side a continuous reverse flange consisting of a downward-projecting portion and a reverse upward-projecting portion at each end thereof, and having upturned lugs at each end of said bridge-plate adapted to abut upon the ends of the base of said angle-bars, substantially as described.

FRANKLIN E. ABBOTT.

Witnesses:

JAMES I. KAY,

ROBERT C. TOTTEN.